United States Patent
Li et al.

(10) Patent No.: US 9,049,480 B2
(45) Date of Patent: Jun. 2, 2015

(54) METHODS AND SYSTEMS FOR DEMAPPING A MULTI-CARRIER SIGNAL

(71) Applicant: Amlogic Co., Ltd., Santa Clara, CA (US)

(72) Inventors: Guogang Li, Shanghai (CN); Jin Niu, Shanghai (CN); Jinhong Zhang, Santa Clara, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 120 days.

(21) Appl. No.: 14/042,562

(22) Filed: Sep. 30, 2013

(65) Prior Publication Data

US 2015/0095966 A1  Apr. 2, 2015

(51) Int. Cl.
| H04N 21/2343 | (2011.01) |
| H04N 21/4402 | (2011.01) |
| H04N 21/438 | (2011.01) |
| H04N 21/44 | (2011.01) |
| H04N 21/426 | (2011.01) |

(52) U.S. Cl.
CPC ........... *H04N 21/4382* (2013.01); *H04N 21/44* (2013.01); *H04N 21/42615* (2013.01)

(58) Field of Classification Search
None
See application file for complete search history.

(56) References Cited

U.S. PATENT DOCUMENTS

| 2007/0036246 A1* | 2/2007 | Hammerschmidt | 375/340 |
| 2007/0280387 A1* | 12/2007 | Li et al. | 375/347 |
| 2008/0291819 A1* | 11/2008 | Gho et al. | 370/208 |
| 2010/0246656 A1* | 9/2010 | Hammerschmidt | 375/229 |

* cited by examiner

*Primary Examiner* — Brian T Pendleton
*Assistant Examiner* — Jean D Saint Cyr
(74) *Attorney, Agent, or Firm* — Venture Pacific Law, PC

(57) ABSTRACT

A method for demapping a multicarrier signal into soft bits by a receiver, comprises the steps of: calculating signal to noise ratio ("SNR") adjustment factors ("A[segidx]") for segments of the signal, wherein each of the segments has a predefined number of subcarriers of the signal; generating an adjusted SNR ("SNR[segidx]") as a function of an average SNR over the subcarriers of the signal and of the calculated SNR adjustment factors; and determining the soft bits for the signal as a function of the signal, a channel estimation for the signal, and the adjusted SNR, wherein the receiver decodes the determined soft bits.

6 Claims, 4 Drawing Sheets

METHODS AND SYSTEMS FOR DEMAPPING A MULTI-CARRIER SIGNAL

FIELD OF INVENTION

This invention relates to methods and systems for a communications system, and, in particular, to methods and systems for demapping a multicarrier signal.

BACKGROUND

There has been a rapid development in the field of digital television broadcasting following the establishment of digital video broadcasting standards for digital terrestrial television ("DVB-T"). Generally, in accordance with a DVB-T standard, a number of carrier frequencies are used to spread data to be transmitted over a large number of orthogonal frequency carriers. Each carrier can be encoded to carry a symbol containing more than one bit, for example using a rectangular constellation modulation system such as 16-QAM, 64-QAM, etc.

FIG. 1 illustrates a 16-QAM constellation map. In a typical constellation map, each point can represent multiple bits. As is known by a person having ordinary skill in the art, each point on the 16-QAM constellation diagram corresponds to a 4-bit symbol, e.g., the four bits can be in a following format $b_0 b_1 b_2 b_3$. Thus, there are 16 distinct combinations of the four bits. The symbols can be assigned to the constellation points according to various coding schemes.

On the transmitter side, the multicarrier signal is modulated in accordance with successive symbols to be transmitted. The multicarrier signal can be received and demodulated on the receiver side to corresponding symbol(s) using a constellation map. In most cases, the signal received will not correspond exactly with a constellation point because of interference or noise in the channel between the transmitter and the receiver. In this situation, the receiver must demodulate the received signal to the symbol corresponding to the constellation point which is most likely to have been transmitted. It is known to de-map signals using soft decision decoding in which instead of a "hard" decision as to whether a bit should be decoded as a "1" or as a "0", a "soft" decision, comprising the hard decision and an indication of the level of confidence to be placed in the decision is output. The information from the de-mapper is passed to a decoder, e.g., a Viterbi decoder, which decodes the bits.

One problem with television broadcasting is the existence of multi-paths arising either as a result of the reception at the receiver of multiple copies of the signal emitted from a single transmitter, or as a result of the reception of signals from a number of transmitters all broadcasting the same signal. In the frequency domain, the existence of multi-paths is equivalent to a frequency selective channel response. Furthermore, in situations where conventional analog television signals are transmitted within or overlapping the frequency range used by the digital television signal, the conventional analog television signals act as narrow interfering signals within the signal bandwidth of the digital television signal.

These frequency selective channel response characteristics result in a large number of different carriers used in the modulation of the signal having different signal to noise ratios ("SNR"). Clearly, data conveyed by carriers having a high SNR is likely to be more reliable than data conveyed by carriers having a low SNR.

An estimate of the SNR of each carrier made by the receiver is called the channel state information ("CSI") for the channel represented by that carrier. This method utilizes pilot carriers with known magnitudes. An estimate is made of the mean square error in the magnitude of the received pilot carriers. Also, the channel state information in the pilot carrier positions can be obtained from this estimate. The channel state information for other data positions can be obtained by subsequent interpolation between the values calculated at the pilot carrier frequencies.

In order to provide robust performance of the system in an environment having a frequency selective channel response, it is known to use the channel state information in the Viterbi decoder when decoding the bits in order to provide extra information regarding the reliability of the bits based on the signal to noise ratio of the carrier. Previously it has also been suggested that if the channel state information of a particular channel is sufficiently bad, it can be concluded that no reliance can be placed on the data received on that channel. As a result, the Viterbi decoder may effectively record that no information is available regarding that bit by disregarding, or "puncturing" the corresponding bit or bits.

The transmitted data is coded using a convolutional code, which introduces redundancy in the signal in order to allow error correction of the signal to be achieved. The effect of the puncturing of data bits in the Viterbi decoder as indicated above is merely to reduce the effective code rate of the signal. If a sufficiently robust code is used, the effective reduction in code rate resulting from the puncturing of bits can be tolerated, thus avoiding an impact on the decoded signal quality. Therefore, there is a desire to provide new methods and systems for demapping that take into account cases where the signal to noise ratio can be varying and/or non-flat.

SUMMARY OF INVENTION

An object of this invention is to provide methods and systems for demapping of a multicarrier signal to generate soft bits and improve overall receiver performance.

Another object of this invention is to provide methods and systems for demapping of a multicarrier signal that can account for narrow band interference and a non-flat noise floor.

Yet another object of this invention is to provide methods and systems for demapping of a multicarrier signal using an adjusted signal to noise ratio.

Briefly, the present invention discloses methods and systems for demapping a multicarrier signal into soft bits by a receiver, comprising the steps of: calculating signal to noise ratio adjustment factors ("A[segidx]") for segments of the signal, wherein each of the segments has a predefined number of subcarriers of the signal; generating an adjusted SNR ("SNR[segidx]") as a function of an average SNR over the subcarriers of the signal and of the calculated SNR adjustment factors; and determining the soft bits for the signal as a function of the signal, a channel estimation for the signal, and the adjusted SNR, wherein the receiver decodes the determined soft bits.

An advantage of this invention is that methods and systems for demapping of a multicarrier signal are provided to generate soft bits and improve overall receiver performance.

Another advantage of this invention is that methods and systems for demapping of a multicarrier signal are provided that can account for narrow band interference and a non-flat noise floor.

Yet another advantage of this invention is that methods and systems for demapping of a multicarrier signal are provided using an adjusted signal to noise ratio to improve receiver performance.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
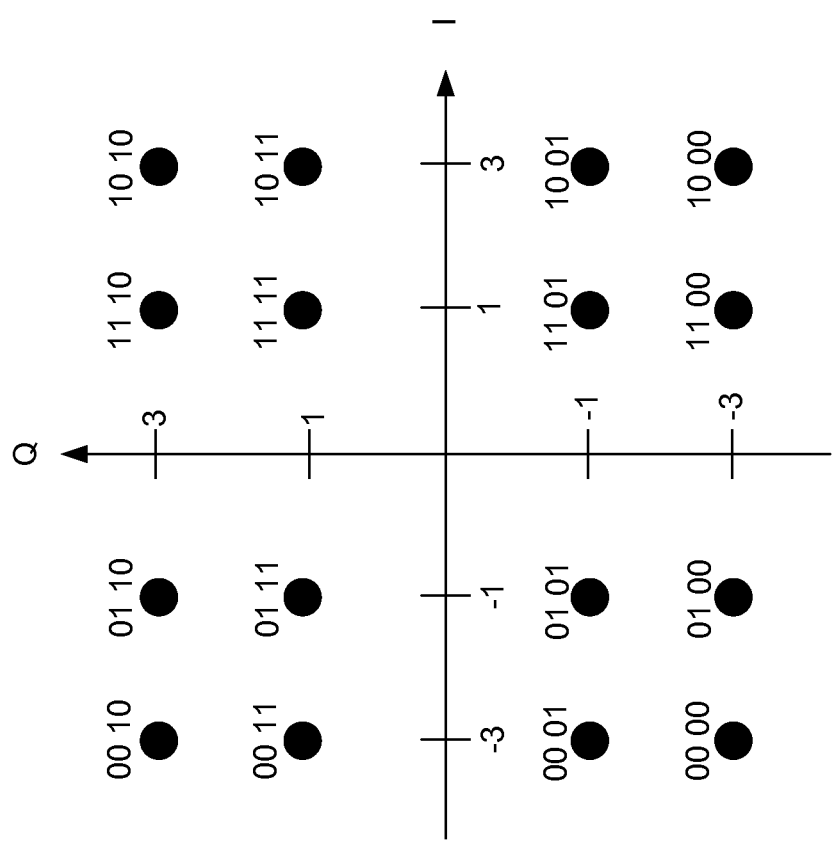
FIG. 1 illustrates a 16-QAM constellation map.
Figure 2:
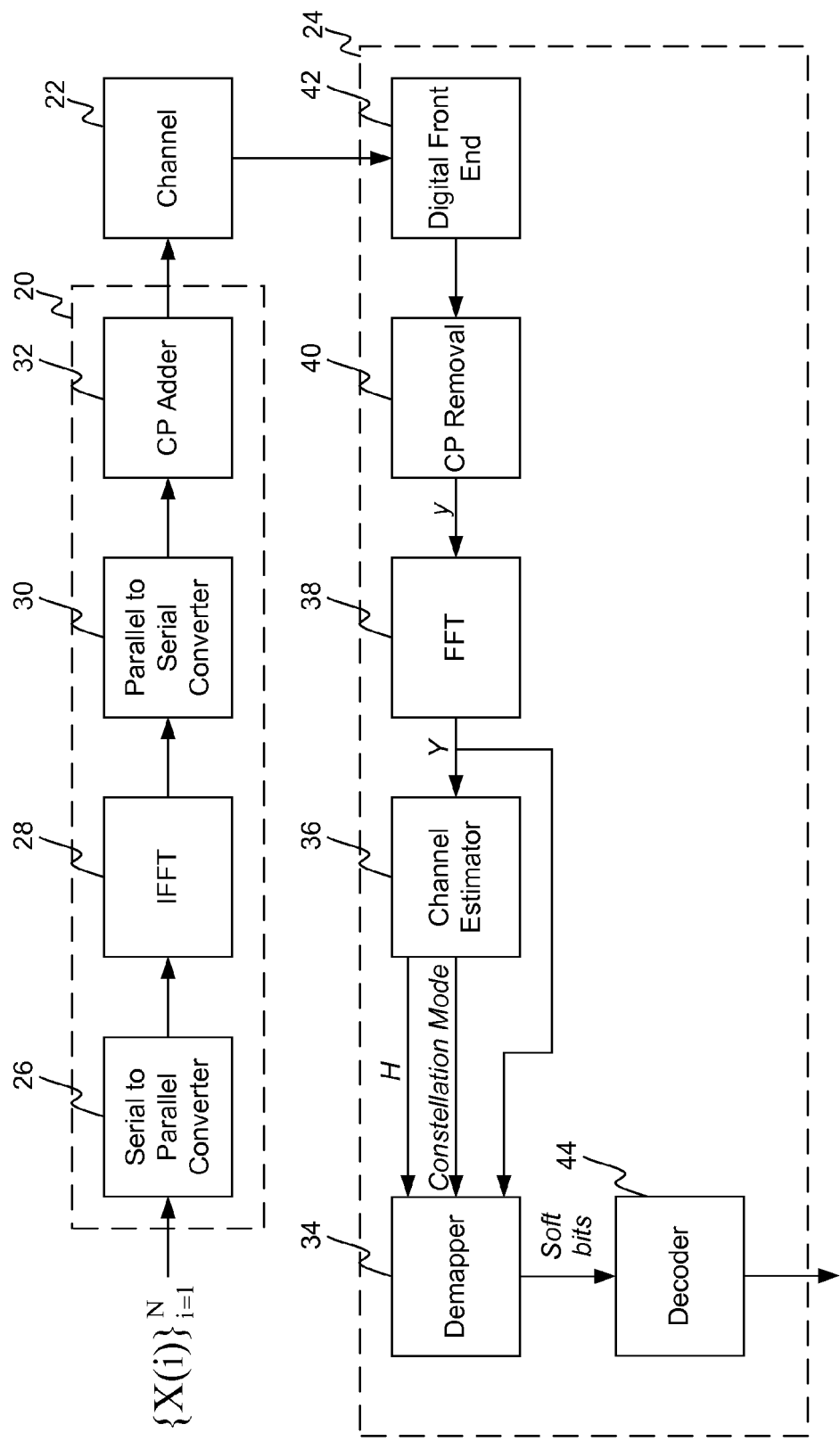
FIG. 2 illustrates a block diagram of a communications system of the present invention.

FIG. 2 illustrates a block diagram of a communications system of the present invention. A multicarrier signal is inputted to a transmitter 20 for transmission over a channel 22, e.g., over-the-air wireless channel. The transmission can be received by a receiver 24 for processing and decoding.

The transmitter 24 comprises a serial-to-parallel converter 26, an inverse fast Fourier transform ("IFFT") block 28, a parallel-to-serial converter 30, and a CP adder block 32. The transmitter 24 may also comprise other blocks for transmitting the signal over the channel 22. However, to aid in the understanding of the invention, the above listed blocks are used to illustrate several key blocks of the transmitter 24. The receiver 24 can comprise a digital front end block 42, a CP removal block 40, a Fast Fourier Transform ("FFT") block 38, a channel estimator 36, a demapper 34, and a decoder 44. It is understood by a person having ordinary skill in the art that a transmitter or receiver of the present invention can have other blocks for transmitting or receiving the signal.

The received signal from the channel 22 can be processed by the digital front end block 42. The digital front end block 42 processes the received signal from an analog signal to a digital signal yy having a predefined sampling rate. The digital signal y can be outputted to the CP removal block 40. The CP removal block 40 outputs the signal y (that is the digital signal without the CP) to the FFT block 38. The FFT block 38 performs a FFT operation on the signal y to convert the signal y from the time domain signal to a frequency domain signal Y. The frequency domain signal is outputted to the channel estimator 36. The channel estimator 36 performs channel estimation on the signal Y to generate a channel frequency response H (also referred to as the channel estimation). The channel estimation H, a constellation mode, and the frequency domain signal Y are inputted to the demapper 34. The demapper 34 uses this information to generate soft bits to output to the decoder 44.

Figure 3:
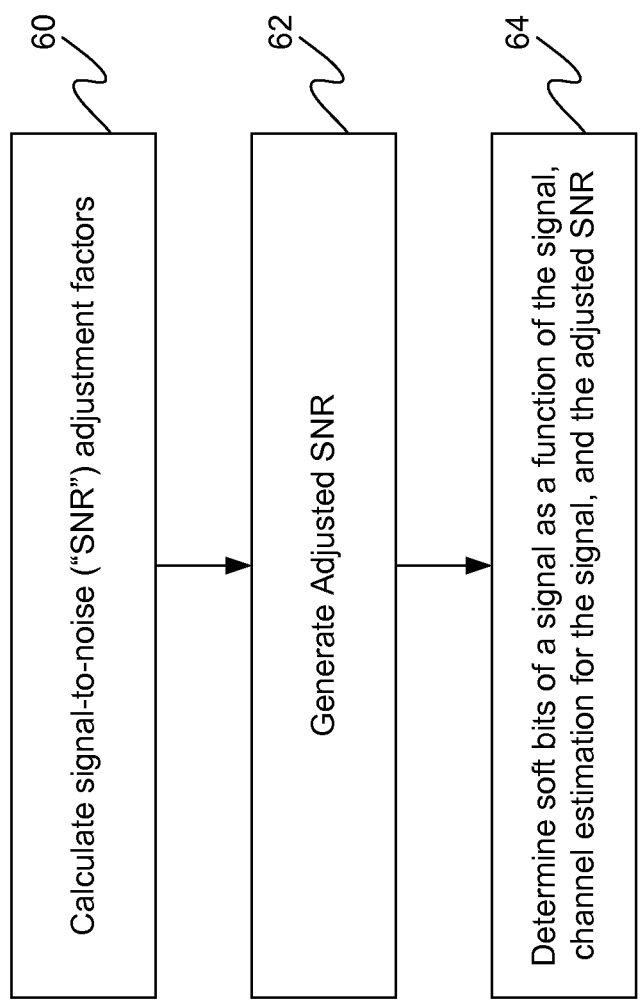
FIG. 3 illustrates a method of the present invention for demapping of a multicarrier signal.

FIG. 3 illustrates a method of the present invention for demapping of a multicarrier signal. In order to demap a received multicarrier signal, signal to noise adjustment factors can be calculated 60 to be applied to soft bits of the received multicarrier signal.

The effective number of subcarriers can be denoted Nsc. Therefore, a hard decision demapper can provide a hard decision symbol $X_D[i]$:

$$X_D[i] = \text{slicer}\left(\frac{Y[i]}{H[i]}\right), i = 1, 2, \ldots, Nsc. \quad \text{Equation [1]}$$

The hard decision symbol, the signal Y(i), and the channel estimation H(i) can be used to generate an average SNR. The average SNR can equal the following:

$$\overline{snr} = \frac{\sum_{i=1}^{Nsc}(H(i)*H(i)^*)}{\sum_{i=1}^{Nsc}((Y(i)-H(i)*X_D(i))(Y(i)-H(i)*X_D(i))^*)}. \quad \text{Equation [2]}$$

Also, the average power can be calculated as follows:

$$avgPow = \frac{1}{Nsc} * \sum_{i=1}^{Nsc}(H(i)*H(i)^*). \quad \text{Equation [3]}$$

The subcarriers can be divided into L segments, where each of the segments has consecutive M carriers. Thus, the number of carriers Nsc is equal to the product of the number of segments L and the number of carriers M in each segment. Next, an error signal err[i] and an average error power errAvg [segidx] can be calculated as follows:

$$err[i] = Y[i] - X_D[i] * H[i], i = 1, 2, ***, Nsc. \quad \text{Equation [4]}$$

$$errPow[segidx] = \frac{1}{M}\left(\sum_{i=M*segidx+1}^{(segidx+1)*M}(err[i]*err[i]^*)\right), \quad \text{Equation [5]}$$

$$segidx = 1, 2, \ldots, L.$$

Next, an average power of each segment can be smoothed by using an alpha filter as follows:

$$errAvg[segidx] = errAvg[segidx-1]*(1-\alpha) + errPow[segidx]*\alpha. \quad \text{Equation [6]}$$

where $\alpha$ can be a predefined value depending on the amount of filtering needed or desired. The $\alpha$ can also be referred to as the forgetting factor of an alpha filter.

Also an average error for each of the segments ("errAvgAll") can be calculated by summing Equation [6] for all the segments, and then dividing by L, the number of segments.

$$errAvgAll = \frac{1}{L} * \sum_{segidx=1}^{L} errAvg[segidx]. \quad \text{Equation [7]}$$

Finally, the SNR adjustment factor ("A[segidx]") can be calculated as a function of the errAvgAll and errAvg[segidx]. For instance, the SNR adjustment factor can equal the following:

$$A[segidx] = \frac{errAvgAll}{errAvg[segidx]}, segidx = 1, 2, \ldots, L \quad \text{Equation [8]}$$

Once the SNR adjustment factors A[segidx] are calculated, an adjusted SNR value can be generated 62. An average SNR ("$\overline{snr}$") can be calculated over the entire carriers from i=1 to i=Nsc. The average SNR and the adjusted SNR can be combined to provide the adjusted SNR by the following equation:

$$SNR[segidx] = \overline{snr} * A[segidx], \, segidx = 1, 2, \ldots, L \quad \text{Equation [9]}$$

Next, the adjusted SNR can be used to determine soft bits 64 to be inputted to the decoder. The soft bits can equal the following:

$$\check{Z}[i] = \frac{Z[i]}{csi[i]} * SNR[segidx], \quad \text{Equation [10]}$$

$$i = 1, 2, \ldots, Nsc, \, segidx = \left[\left(\frac{i-1}{M}\right)\right] + 1$$

where Z[i] can be approximated by $H[i]^2 * X_D[i]$ and csi[i] is a channel state information and equal to $|H[i]|^2$.

Figure 4:
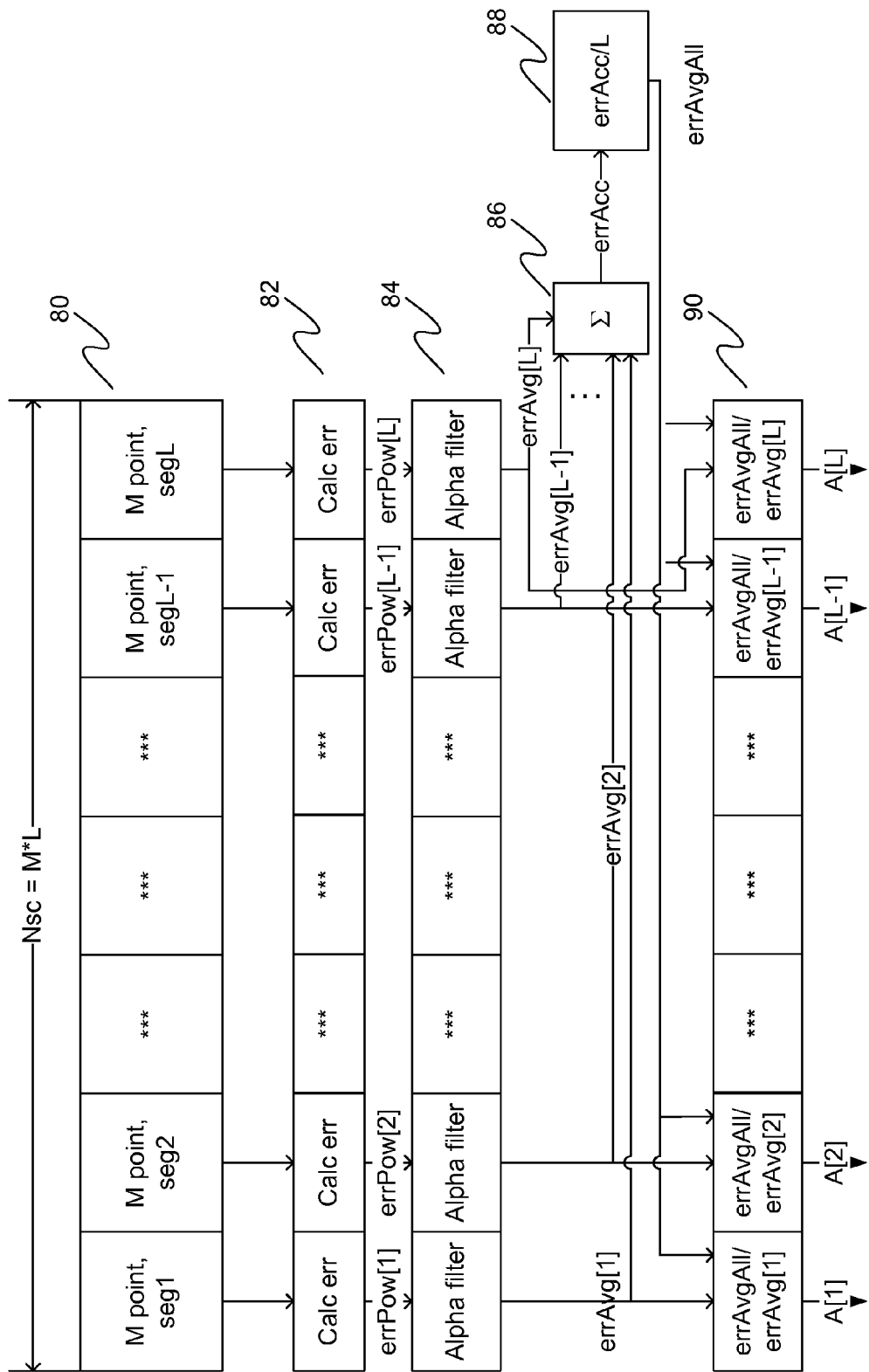
FIG. 4 illustrates a block diagram of the present invention for generating SNR adjustment factors.

FIG. 4 illustrates a block diagram of the present invention for generating SNR adjustment factors. Carriers of a multicarrier signal can be partitioned into several segments 80, where each segment is M subcarriers wide for a total of L segments. For each of the several segments 80, an error calculation is performed to obtain errors 82 for each of the segments 80. Alpha filters 86 can be applied to the errors 82 to generate average errors for each of the segments 80. The average errors can be summed by a summing block 86. The sum can be further inputted to a divider block 88 that divides the summed errors by the number of segments L. Thus, an average segment error errAvgAll is determined and combined with each of the average error errAvg[segidx] for each segment in blocks 90 to determine the SNR adjustment factors, A[segidx].

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for demapping a multicarrier signal into soft bits by a receiver, comprising the steps of:
    calculating signal to noise ratio ("SNR") adjustment factors ("A[segidx]") for segments of the signal, wherein each of the segments has a predefined number of subcarriers of the signal, further comprising the steps;
        determining an error ("err[i]") for the signal;
        determining an average error power ("errAvg") for the segments as a function of the calculated error, wherein the determined average error power is an iterative function with an alpha filter and wherein determined average power is equal to the following:

errAvg[segidx]=errAvg[segidx−1]*(1−α)+errPow [segidx]*α, segidx=1, 2, . . . ,L where segidx is an index of the segments, α is a predefined constant, errPow( ) function is the average error power of the segments, and L is a total number of the segments; and
        calculating SNR adjustment factors as a function of the determined average error power;
    generating an adjusted SNR ("SNR[segidx]") as a function of an average SNR over the subcarriers of the signal and of the calculated SNR adjustment factors; and
    determining the soft bits for the signal as a function of the signal, a channel estimation for the signal, and the adjusted SNR,
    wherein the receiver decodes the determined soft bits.

2. The method of claim 1 wherein an average error for the segments are calculated ("errAvgAll") and wherein the SNR adjustment factors is equal to $$A[segidx] = \frac{errAvgAll}{errAvg[segidx]}, \, segidx = 1, 2, \ldots, L.$$

3. The method of claim 1 wherein the determined soft bits ("$\check{Z}[t]$") equal to $$\check{Z}[i] = \frac{Z[i]}{csi[i]} * SNR[segidx],$$

$$i = 1, 2, \ldots, Nsc, \, segidx = \left[\left(\frac{i-1}{M}\right)\right] + 1$$

where Z[i] is equal to about $|H[i]|^2 * X[i]$, where X[i] is a hard decision symbol for the signal, and
where csi[i] is a channel state information.

4. A method for demapping a multicarrier signal into soft bits by a receiver, comprising the steps of:
    calculating signal to noise ratio ("SNR") adjustment factors ("A [segidx]") for segments of the signal, wherein each of the segments has a predefined number of subcarriers of the signal, further comprising the steps;
        determining an error ("err[i]") for the signal;
        determining an average error power ("errAvg") for the segments as a function of the calculated error, wherein the determined average error power is an iterative function with an alpha filter and wherein the determined average power is equal to the following;

errAvg[segidx]=errAvg[segidx−1]*(1−α)+errPow [segidx]*α, segidx=1, 2, . . . ,L, where segidx is an index of the segments, α is a predefined constant, errPow( ) function is the average error power of the segments, and L is a total number segments; and
        calculating SNR adjustment factors as a function of the determined average error power;
    generating an adjusted SNR ("SNR[segidx]") as a function of an average SNR over the subcarriers of the signal and of the calculated SNR adjustment factors; and
    determining the soft hits for the signal as a function of the signal, a channel estimation for the signal, and the adjusted SNR,
    wherein the determined soft bits ("$\check{Z}[i]$") equal to $$\check{Z}[i] = \frac{Z[i]}{csi[i]} * SNR[segidx],$$

$$i = 1, 2, \ldots, Nsc, \, segidx = \left[\left(\frac{i-1}{M}\right)\right] + 1$$

where Z[i] is equal to about $|H[i]|^2 * X[i]$, where X[i] is a hard decision symbol for the signal, and
where csi[i] is a channel state information, and
    wherein the receiver decodes the determined soft bits.

5. The method of claim 4 wherein an average error for the segments are calculated ("errAvgAll") and wherein the SNR adjustment factors is equal to $$A[segidx] = \frac{errAvgAll}{errAvg[segidx]}, segidx = 1, 2, \ldots, L.$$

6. A method for demapping a multicarrier signal into soft bits by a receiver, comprising the steps of:
   calculating signal to noise ratio ("SNR") adjustment factors ("A[segidx]") for segments of the signal, wherein each of the segments has a predefined number of subcarriers of the signal, further comprising the steps:
   determining an error ("err[i]") for the signal;
   determining an average error power ("errAvg") for the segments as a function of the calculated error, wherein the determined average error power is an iterative function with an alpha filter, and wherein the determined average power is canal to the following:

errAvg[segidx]=errAvg[segidx−1]*(1−α)+errPow[segidx]*α, segidx=1, 2, . . . ,L, where segidx is an index of the segments, α is a predefined constant, errPow( ) function is the average error power of the segments, and L is a total number of the segments; and
   calculating SNR adjustment factors as a function of the determined average error power,
   wherein an average error for the segments are calculated ("errAvgAll") and wherein the SNR adjustment factors is equal to $$A[segidx] = \frac{errAvgAll}{errAvg[segidx]}, segidx = 1, 2, \ldots, L;$$

generating an adjusted SNR ("SNR[segidx]") as a function of an average SNR over the subcarriers of the signal and of the calculated SNR adjustment factors; and
   determining the soft bits for the signal as a function of the signal, a channel estimation for the signal, and the adjusted SNR,
   wherein the determined soft bits ("Ž[i]") equal to $$\check{Z}[i] = \frac{Z[i]}{csi[i]} * SNR[segidx],$$

$$i = 1, 2, \ldots, Nsc, segidx = \left[\left(\frac{i-1}{M}\right)\right] + 1$$

where Z[i] is equal to about |H[i]|²*X[i], where X[i] is a hard decision symbol for the signal, and
   where cs[i] is a channel state information, and
   wherein the receiver decodes the determined soft bits.

* * * * *